Oct. 25, 1966  H. R. SHILLINGTON  3,281,675
CIRCUIT FOR TESTING A CAPACITOR FOR MOMENTARY BREAKDOWN
WHEN A D.C. VOLTAGE IS APPLIED THERETO INCLUDING
MEANS RESPONSIVE TO CHARGING OF THE CAPACITOR
Filed Aug. 22, 1963
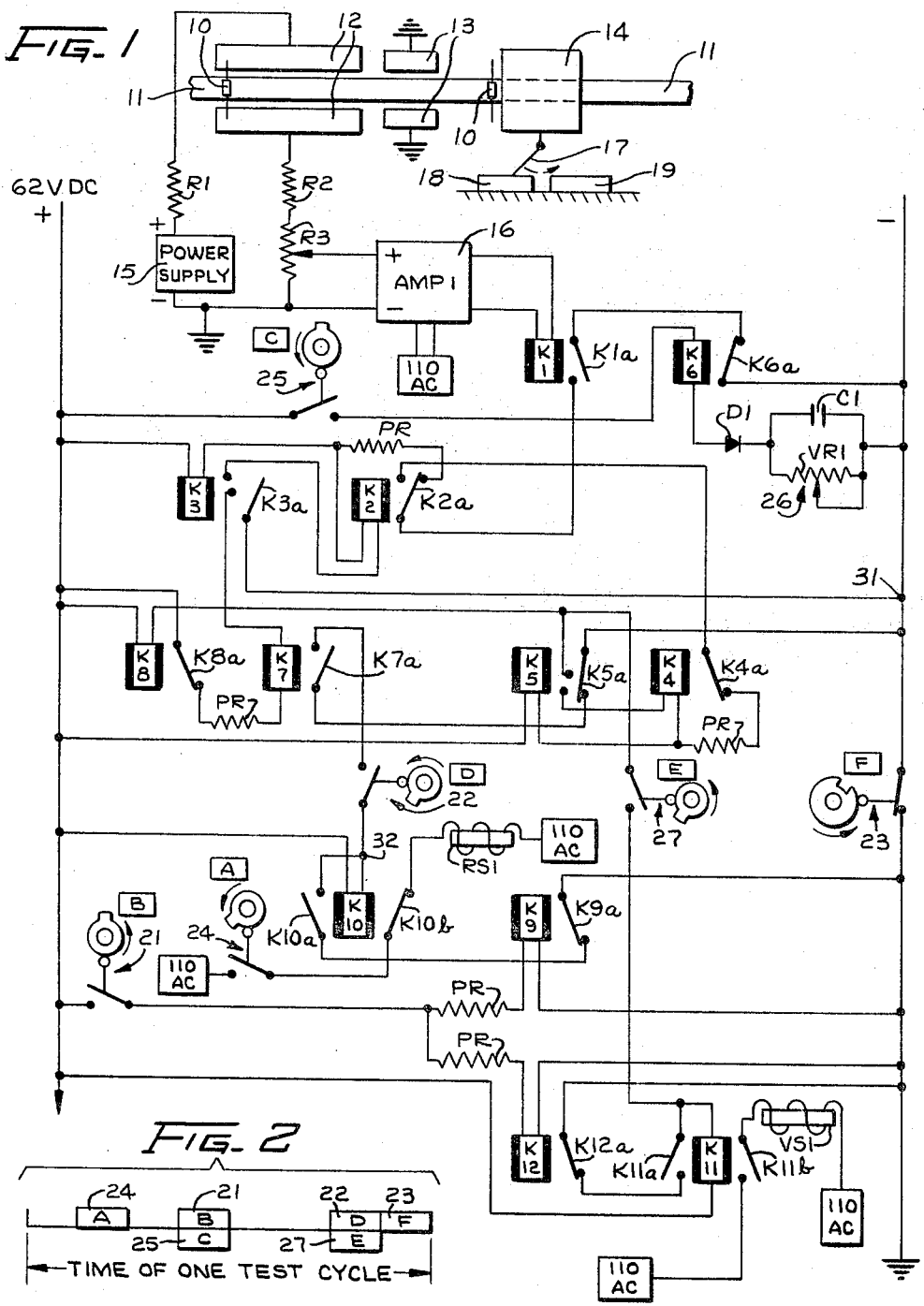
A  REJECT SOLENOID
B  MEMORY & VANE RELEASE
C  SHORT CIRCUIT TEST
D  MEMORY SET
E  VANE SET
F  RESET FOR RELAYS K1 TO K8
INVENTOR
H.R. SHILLINGTON
BY
ATTORNEY

United States Patent Office 3,281,675
Patented Oct. 25, 1966

3,281,675
CIRCUIT FOR TESTING A CAPACITOR FOR MOMENTARY BREAKDOWN WHEN A D.C. VOLTAGE IS APPLIED THERETO INCLUDING MEANS RESPONSIVE TO CHARGING OF THE CAPACITOR
Harry R. Shillington, Glen Ellyn, Ill., assignor to Western Electric Company, Incorporated, New York, N.Y., a corporation of New York
Filed Aug. 22, 1963, Ser. No. 303,848
4 Claims. (Cl. 324—54)

This invention relates to a capacitor testing circuit, and more particularly to a circuit for testing a capacitor for momentary breakdown when a D.C. voltage is applied thereto. It is an object of this invention to provide an improved circuit of such character.

Many capacitors are made by separating electrodes of alternate polarity with a high dielectric film. One capacitor which typifies this general category of capacitors is a metallized Mylar type wherein alternate electrodes are separated by a high dielectric film of Mylar material.

In capacitors of this type minute pinhole faults may be present in the dielectric material. When a potential is placed across such a capacitor the charge will leak through the relatively low dielectric air which has replaced the high dielectric film at the point of the pinhole fault and arcing will occur between the electrodes of opposed polarity. This arcing or momentary breakdown is generally of short duration as the heat developed thereby is sufficient to cause vaporization of those portions of the opposed electrodes which are in the area adjacent the pinhole fault. Thus, the portions of the opposed electrodes which lie in the area of a pinhole fault are removed and the capacitor may thereafter be recharged.

Although capacitors having this particular type of fault may have a long and useful life in many applications, it has been found that their trouble-free life expectancy is much lower than those capacitors which do not have such faults. Thus, in the testing of capacitors of this type, which are to be utilized in complex communication equipment, it is essential to detect and reject capacitors which suffer momentary brakdowns when a D.C. voltage is applied thereto for the first time.

It is another object of this invention to provide an improved capacitor testing circuit which gives an indication of a momentary breakdown in a capacitor under test.

It is still another object of this invention to provide an improved capacitor testing circuit which gives an indication of either a momentary breakdown or a dead short in a capacitor under test.

It is still another object of this invention to provide an improved capacitor testing circuit which detects and causes the rejection of capacitors which suffer either a momentary breakdown or a dead short.

It is a further object of this invention to provide an improved capacitor testing circuit which sequentially tests a plurality of capacitors and causes rejection of individual capacitors which suffer either a momentary breakdown or a dead short during the testing thereof.

It is a still further object of this invention to provide an improved capacitor testing circuit having various of the characteristics set forth above while being simple and inexpensive to build and reliable and efficient in operation.

A circuit embodying the principles of the present invention utilizes a capacitor charging circuit for placing a potential across the capacitor under test. A circuit associated with the charging circuit produces an electrical signal during each charging or recharging of the capacitor. The signal so produced occurs only during the charging time of the capacitor under test and in most instances is of a transient nature as the capacitor is generally charged up to its full potential over a very short time interval. The circuit produces a single transient signal during an initial charging of the capacitor and thereafter produces a second signal of a similar nature when a momentary breakdown of and a consequent recharging of the capacitor occurs. A counting circuit is provided which counts the pulses and provides a suitable indication when more than one pulse is produced. More specifically, additional circuits are provided which respond to the number of counts indicated by the counting circuit such that segregation of defective capacitors may be effected.

This invention together with further objects and advantages thereof will best be understood by reference to the following description taken in connection with the accompanying drawings, in which:

FIG. 1 is a schematic drawing of a preferred embodiment of the circuit of this invention; and FIG. 2 is a pictorial representation of the time sequence of actuations of various cam controlled circuits of FIG. 1 which occur during a single test cycle.

The description of the circuit and its operation appearing below first covers the circuitry and its operation in the event that an acceptable capacitor is under test. This is followed by an explanation of further circuitry and operation in the event the capacitor momentarily breaks down, or is short circuited, or has no potential applied thereto.

*Test of an acceptable capacitor*

Since the preferred embodiment of the circuit of this invention is illustrated in an environment wherein a succession of individual capacitors are tested, it will be assumed that an acceptable capacitor has preceded the test cycle which is now to be described.

In the following description of the circuit, reference to a relay or its associated armature being in its normal or open condition or position means that the relay is deenergized and its associated armature is in the position it assumes when the relay is deenergized. Likewise, reference to a relay or its associated armature being in its actuated or closed condition or position means that the relay is energized and its associated armature is in the position it assumes when the relay is energized.

Reference is made to FIG. 1. During each test cycle of approximately 2.5 seconds duration, a test capacitor 10 is moved successively by a belt 11 along a pair of commutator strips 12, across a second pair of commutator strips 13 which are connected to ground potential to dissipate any charge stored in a test capacitor, and through a rejection station 14 which rejects and segregates capacitors which fail the test.

Since the design of the mechanical apparatus employed in association with the circuit of this invention is relatively well known in the art, no further detailed description thereof will be given.

When the leads of the capacitor 10 first engage the commutator strips 12, the test capacitor is subjected to a preselected continuous test potential by a 500 to 2500 volt regulatable D.C. voltage supply 15. Since the capacitor is initially uncharged, a charging current flows through R2 and R3 which are arranged in series in circuit relationship with the capacitor, and a charging potential appears across input leads of an amplifier 16. Preferably the registor R3 is in the form of a potentiometer in order that the magnitude of the signal to the amplifier may be regulated.

When the capacitor under test is of an acceptable nature, the potential appearing across the input leads of the amplifier 16 is of a decreasing transient nature, since it takes only a relatively short time to charge the capacitor 10 to its full potential. Thus, the input leads of the amplifier are both at essentially ground potential when the capacitor is fully charged. The output from the amplifier, which actuates the coil of a relay K1, also is of a transient nature whereby a normally open armature K1a associated with the relay K1 is actuated to a closed position only momentarily.

When the armature K1a is actuated to its closed position as a result of a charging of the capacitor 10, a ground signal is established through the coil of a relay K3, the armature K2a of a relay K2, the armature K1a, and the armature K6a of a relay K6. The closure of the armature K1a is thereby effective to establish a ground signal on other associated parts of the circuit. Completion of this ground signal in response to an initial charging of the capacitor causes the relay K3 to close its associated armature K3a whereby a circuit is completed through the armature K8a of a relay K8, the coil of a relay K7, the now closed armature K3a, and thus to a point of ground potential 31. Actuation of the coil of relay K7 causes its associated, normally open armature K7a to close.

The armature K1a of the relay K1 reopens upon termination of the initial charging of the capacitor 10 to its full potential. The ground signal on the coil of the relay K3, established when the armature K1a closed, is now terminated but the coil of the relay K3 is now grounded through an alternate circuit path established through the coil of the relay K2, the now closed armature K3a, and thus to ground potential at point 31. Since the coil of relay K2 is now actuated, its associated armature K2a is actuated from a normally open to an energized position.

Thus, in response to the reopening of the armature K1a of the relay K1 and termination of the ground signal provided thereby, the armatures K2a, K3a and K7a respectively associated with relays K2, K3 and K7 all achieve their closed position whereby this group of three relays achieve a second state which is indicative of a counting of one pulse by the circuit of this invention.

Although the capacitor under test may fail in one way or another during the rest of its progressive movement across the commutator strips 12, description of the actuations of various parts of the circuit of this invention in detecting such failures is reserved until the description below of capacitors under test which have such detectable failures.

As best shown in FIG. 2, approximately half-way through the test cycle, after the relays K2, K3 and K7 have achieved their second state, a memory circuit which consists of a relay K10 is deenergized so that information stored therein during the last preceding cycle is eliminated. The memory relay K10 has two associated armatures K10a and K10b. As is explained below, these armatures are in their actuated or closed position, rather than their normally open position, since it has been assumed that an acceptable capacitor was tested during the last preceding cycle.

The armatures K10a and K10b associated with the relay K10 are locked in a closed position because a ground potential is applied to the coil of the relay K10 through a connection point 32, through the armature K10a and the armature K9a of a relay K9. To reopen the armatures K10a and K10b a normally open cam controlled switch 21 is momentarily closed during a mid-portion of the test cycle to complete a ground circuit through the coil of the relay K9 whereby its associated armature K9a is actuated from its normal contact closed position to its actuated position, thereby opening the above-described ground circuit to the coil of the relay K10 such that its associated armatures K10a and K10b return to their normally open positions indicative of a first state for the memory circuit.

After the reopening of the armatures K10a and K10b, the memory circuit is reset near the end of the test cycle to store information concerning the capacitor now under test. Storing of new information in the memory circuit is effected by momentary closure of a normally open cam controlled switch 22 near the end of the test cycle allowing the coil of relay K10 to be connected to ground potential through the cam control switch 22, the now closed armature K7a associated with the relay K7, and a normally positioned armature K5a associated with a relay K5. Since the coil of the relay K10 is momentarily actuated, its associated armatures K10a and K10b are drawn to their actuated positions and upon reopening of the cam control switch 22, the ground circuit to the coil of the relay K10 is provided through point 32, the now actuated armature K10a, and the armature K9a associated with relay K9 which has returned to its normal, contact closing position upon reopening of the cam controlled switch 21. Thus, the armatures K10a and K10b of the relay K10 are actuated from a first state (normally open position) to a second state (closed position) in response to the counting of a single pulse by that portion of the circuit of this invention indicated by achievement of the second state by the relays K2, K3 and K7.

The capacitor 10 under test now passes from the commutator strips 12 to the commutator strips 13 whereat the charge on the acceptable capacitor is dissipated. The acceptable capacitor 10 is then advanced to the reject station 14 at the same time as a new capacitor to be tested is engaging the commutator strips 12.

At the end of the test cycle on the acceptable capacitor and before the next capacitor reaches the commutator strips, a normally closed cam controlled switch 23 operates to open the ground circuit to the coils of relays K1 through K8 whereby their associated armatures are returned to a normal position if they had been actuated during the test cycle.

As shown in FIG. 2, a normally open cam controlled switch 24, which effects operation of the reject station 14, is momentarily closed at the time the acceptable capacitor reaches the reject station. If the armature K10b of the relay K10 was in its normal position, closure of the switch 24 would complete a 110 A.C. circuit across a reject solenoid RS1. However when the switch 24 is closed, a circuit is not completed through the reject solenoid RS1 since the armature K10b is in its second or actuated state as the result of testing an acceptable capacitor. Thus, the capacitor 10 which has just undergone the test cycle passes from the reject station for further testing procedures since the memory circuit is in its second state.

*Testing of a capacitor which suffers a momentary breakdown*

For the purpose of describing further portions of the preferred circuit embodying the concepts of this invention, let it be assumed that the capacitor 10, which has been advanced to the commutator strips 12 as the acceptable capacitor is passing through the reject station 14, is one which will undergo a momentary breakdown and a consequent recharging thereof during some portion of the test cycle.

When the newly presented capacitor 10 initially engages the commutator strips 12, the initial charging of the capacitor to full potential results in a momentary closure of the armature K1a associated with the relay K1 such that a ground signal is applied to the coil of the relay K3 in the aforedescribed manner. Also, in accordance with the aforegoing description, the armature K7a associated with the relay K7 closes, and the armature K2a associated with the relay K2 closes upon the reopening of the armature K1a.

It should be noted that a momentary breakdown of the capacitor will be detected by the circuit at any time from the initial charging of the capacitor to the end of the test cycle but, in this description, it is assumed that the breakdown occurs after the mid-portion of the test cycle. As previously described, during the mid-portion of the test cycle, the cam controlled switch 21 is momentarily closed to release the armatures K10a and K10b associated with the relay K10 to remove the information stored therein concerning the last tested capacitor.

When the capacitor now under test undergoes a momentary breakdown, the armature K1a recloses in response to, and during the consequent recharging of the test capacitor to full potential. Since the armature K2a of relay K2 has closed and remains closed in response to the termination of the first ground signal developed when the capacitor was charged initially to full potential, the second ground signal developed upon reclosure of the armature K1a is applied to the coil of the relay K5 via a circuit path established through the now closed armature K2a of the relay K2, and the normally positioned armature K4a of a relay K4.

Upon application of the second ground signal to the coil of the relay K5, its associated armature K5a is closed whereby the coil of the relay K8 is connected through the armature K5a to ground potential. Actuation of the coil of relay K8 closes its associated armature K8a such that the ground circuit to the coil of the relay K7, established upon the initial charging of the test capacitor, is reopened. The armature K7a associated with the relay K7 now returns to its normally open position.

When the armature K1a of the relay K1 reopens upon the complete recharging of the test capacitor, the ground potential for the coil of the relay K5 is supplied by way of an alternate path through the coil of the relay K4, and the actuated armature K5a. As a result of the establishment of this new ground circuit, the armature K4a of relay K4 is closed.

Thus, during the testing of a capacitor which undergoes a momentary breakdown, the armatures associated with the relays K2, K3 and K7 are actuated from a first state (all open) to a second state (all closed) indicative of the counting of a single signal produced upon the initial charging of the capacitor and thence to a third state (armatures of the relays K2 and K3 closed and the armature of the relay K7 open) indicative of the counting of a second signal produced upon the consequent recharging of the capacitor after a momentary breakdown.

With the armature K7a of the relay K7 open, as the result of momentary breakdown in the test capacitor, closure of the cam controlled switch 22 near the end of the test cycle does not result in a ground potential being applied to the coil of the relay K10. Since the group of relays K2, K3 and K7 are not in their second state, the armatures K10a and K10b of the relay K10 remain in their first state (normally open position) after actuation of the switch 22 such that the subsequent closure of the switch 24 causes actuation of the reject solenoid RS1 and a rejection of the capacitor at the reject station 14.

*Capacitors having a dead short*

The capacitor 10, now under test, is assumed to be one which has a dead short thereacross. When such a capacitor first contacts the commutator strips 12, the ground circuit for the coil of the relay K3 is completed through closure of the armature K1a of the relay K1 in response to initial charging of the test capacitor. However, the initial charging of a shorted capacitor is continuous and as a result thereof the armature K1a remains in its closed position whereby the armature K2a of the relay K2 cannot close to permit the group of relays K2, K3 and K7 to achieve their second state.

In the preferred embodiment of this invention, a circuit is provided which consists of a cam controlled, normally open short circuit test switch 25, the coil of the relay K6, and a network system 26 to effect rejection of shorted capacitors.

At approximately the same time that the memory release cam switch 21 is operated (FIG. 2), the short circuit test switch 25 is closed to connect the coil of relay K6 to ground potential through the network system 26 whereby the armature K6a of the relay K6 is actuated to its closed position such that the ground signal through the armature K1a of the relay K1 is momentarily terminated. Upon momentary termination of the ground signal, the armature K2a of relay K2 is closed. When the armature K6a of the relay K6 is released, the ground signal through the armature K1a is applied to the coil of the relay K5 in the manner described in conjunction with the testing of a capacitor which suffered a momentary breakdown whereby the various portions of the circuit are conditioned to states wherein a subsequent rejection of the shorted capacitor is effected at the reject station 14.

The network system 26, which consists of a diode D1 in series with a parallel grouping of a capacitor C1 and a variable resistance VR1, is provided to effect a prompt reopening of the armature K6a after the coil of the relay K6 has been connected to ground potential. Since the principles embodied in the network system are known to those skilled in the art, no further description thereof will be given.

It should be noted that the rapid operation of the short circuit portion of the circuit of this invention during each test cycle in no way affects the manner of operation of the remaining portions of the total circuit when the capacitor under test is one which falls into previously described categories.

*Failure of power system*

If the power system 15 fails, no ground signal is developed because there is no closure of the armature K1a of relay K1, as there is no initial charging of the capacitor and, as a result thereof, all of the armatures of relays K1–K8 remain in their open position. However, during the test cycle, the armatures of the memory relay K10 are reset to their normally open position, and when the reject cam switch 24 is actuated during the subsequent test cycle, the capacitor is rejected.

However, to separate those capacitors across which no potential was placed from those capacitors which had either a dead short or a momentary breakdown, a vane setting circuit is provided. The capacitor across which no potential was placed may then be retested by the circuit of this invention.

The vane setting circuit controls a vane 17, at the reject station 14, which is conditioned to a first position for delivering capacitors which have no potential placed thereacross into a first bin 18, and is conditioned to a second position for diverting capacitors having either a momentary breakdown or a dead short into a second bin 19. The vane setting circuit utilizes a pair of relays K11 and K12 and the operation thereof to effect a conditioning of the vane 17 from its first position to its second position is described below.

When the capacitor under test has either a short circuit or a momentary breakdown, the armature K5a associated with the relay K5 is actuated to its closed position as previously described. Thus, when a normally open, cam controlled switch 27 is momentarily closed, a ground circuit to the coil of the relay K11 is completed through the cam switch 27, and the armature K5a of the relay K5. Upon reopening of the cam switch 27, the coil of relay K11 is grounded through a circuit path which includes the now closed armature K11a of the relay K11, and the armature K12a of the coil of relay K12.

When the coil of the relay K11 is actuated in the above-described manner, a second armature K11b associated therewith is moved to a closed position, whereby a 110 volt A.C. circuit is established through a vane setting solenoid VS1 to position the vane 17 at the reject station 14 to its second position.

Thus, in response to a capacitor under test suffering either a momentary breakdown or a dead short thereacross, the vane 17 is conditioned to its second position whereby the tested capacitor is rejected into the second bin 19.

When the capacitor under test has no potential placed thereacross, the relay K5 is not operated and thus the relay K11 leaves its associated armatures K11a and K11b in an open position, whereby the vane 17 remains in its first position such that the tested capacitor is rejected into the first bin 18 if no potential has been placed thereacross during the testing cycle.

The relay K11 is reset to its normally open position at the same time as the relay K10 is reset. When the cam control switch 21 is closed, a ground circuit to the coil of relay K12 is established as well as the ground circuit to the coil of relay K9. Upon actuation of the coil of relay K12, its associated armature K12a is actuated whereby the ground circuit on the coil K11 is opened and its associated armatures K11a and K11b are returned to their normally open positions to interrupt the operation of the vane setting solenoid VS1.

For the purpose of further illustration, but without any intention of limiting the invention, reference is made to the following table for one form of circuit components of the circuit of this invention:

| | |
|---|---|
| Power Supply 15 | NJE Model S–326RM 500–2500 v. D.C. 0–50 ma. |
| Amplifier 16 | L & N Speedomax "H" No. 101040. |
| Relay K1 | WE–275–B. |
| Relays K2, K3, K4, K5, K6, K7, K8, K9, K12 | WE–275–A. |
| Relays K10, K11 | Ohmite DODYX–68T. |
| Diode D1 | IN 1695. |
| Capacitor C11 | 100 mfd. |
| Resistors R1 and R2 | 100K–50 watt. |
| Resistor R3 | 100 R. |
| VR1 | 100K–2 watt. |
| *Resistors PR | 2K. |

*Resistors marked PR are placed in the circuit only to protect the coils of various relays.

The present invention has been described as embodied in a capacitor testing circuit which gives an indication of a momentary breakdown or a dead short in a capacitor under test. The indication of these failures in a capacitor is then utilized to effect a rejection of such capacitors. The circuit embodying the various characteristics is simple and inexpensive to build while being reliable and efficient in operation.

It is to be understood that the above-described circuit is simply illustrative of a preferred embodiment of the concepts of this invention. Numerous other arrangements may be readily devised by those skilled in the art which will embody the concepts of this invention and thus fall within the true spirit and scope thereof.

What is claimed is:

1. In a circuit for testing a capacitor for momentary breakdown when a D.C. voltage is applied thereto and for effecting a rejection of an unsatisfactory capacitor:
   a capacitor charging circuit for placing a potential across the capacitor for a predetermined time interval;
   circuit means associated with said charging circuit for producing an electrical signal during each charging of the capacitor such that a single signal occurs from an initial charging of the capacitor and a second signal occurs upon momentary breakdown of and a consequent recharging of the capacitor;
   a counting circuit responsive to said circuit means for counting the number of signals produced by said circuit means and for indicating the number of signals so counted;
   a memory circuit responsive to said counting circuit for recording the indicated number of signals counted by said counting circuit; and
   a circuit responsive to said memory circuit for effecting a rejection of the capacitor whenever said memory circuit has recorded an indication of a counting of at least two signals by said counting circuit.

2. In a circuit for testing a capacitor for momentary breakdown when a D.C. voltage is applied thereto and for effecting a rejection of an unsatisfactory capacitor:
   a capacitor charging circuit for placing a potential across the capacitor for a predetermined time interval;
   first circuit means associated with said charging circuit for producing an electrical signal during each charging of the capacitor such that a single signal occurs from an initial charging of the capacitor and a second signal occurs upon momentary breakdown of and a consequent recharging of the capacitor;
   second circuit means having first, second and third operating states and responsive to said first circuit means, said second circuit means being conditionable from its first state to its second state upon detection of the single signal and conditionable from the second state to its third state upon detection of the second signal;
   a memory circuit having first and second operating states, said operating states being controlled by said second circuit means such that said memory circuit is conditioned from its first state to its second state only when said second circuit means is in its second state; and
   a rejecting circuit responsive to said memory circuit for effecting the rejection of the capacitor when the memory circuit is in its first state.

3. In a circuit for testing a capacitor both for a dead short and a momentary breakdown when a D.C. voltage is applied thereto and for effecting a rejection of the capacitor if it has either of the aforementioned defects:
   a capacitor charging circuit for placing a potential across the capacitor for a predetermined time interval;
   circuit means associated with said charging circuit for producing an electrical signal during each charging of the capacitor such that a single signal occurs from an initial charging of the capacitor and a second signal occurs upon momentary breakdown of and a consequent recharging of the capacitor;
   second circuit means having first, second and third operating states and responsive to said first circuit means, said second circuit means being conditionable from its first state to its second state upon termination of the single signal and conditionable from the second state to its third state upon detection of the second signal;
   a terminating circuit for effecting a momentary termination of a prolonged single signal produced by said first circuit means in response to a continuous initial charging of a shorted capacitor such that said second circuit means detects a second signal and is conditioned to its third state in response to a charging of the capacitor after the operation of said terminating circuit;
   a memory circuit having first and second operating states, said operating states being controlled by said second circuit means such that said memory circuit is conditioned from its first state to its second state only when said second circuit means is in its second state; and
   a rejecting circuit responsive to said memory circuit for effecting the rejection of the capacitor when the memory circuit is in its first state.

4. In a circuit for testing a capacitor both to effect a rejection of the capacitor into a first lot when a D.C. voltage is not applied thereto during the test and also to effect a rejection of the capacitor into a second lot when the capacitor has a dead short or a momentary breakdown when a D.C. voltage is applied thereto during the test:
- a capacitor charging circuit for placing a potential across the capacitor for a predetermined time interval;
- first circuit means associated with said charging circuit for producing an electrical signal during each charging of the capacitor such that a single signal occurs from an initial charging of the capacitor and a second signal occurs upon momentary breakdown of and a consequent recharging of the capacitor;
- a detecting circuit having first, second and third states and responsive to said first circuit means and conditionable from its first state to its second state upon termination of the first signal;
- an indicating circuit responsive to said first circuit means for indicating a detection of the second signal and upon detection thereof for altering the condition of said detecting circuit from its second state to its third state;
- a terminating circuit for effecting a momentary termination of a prolonged single signal produced by said first circuit means in response to a continuous initial charging of a shorted capacitor such that said indicating circuit responds to a signal developed upon charging of the capacitor after the operation of said terminating circuit;
- a memory circuit having first and second operating states said operating states being controlled by said detecting circuit such that said memory circuit is conditioned from its first state to its second state only when said detecting circuit is in its second state;
- a vane setting circuit having first and second states and responsive to said indicating circuit such that said vane circuit is conditioned from its first state to its second state only when said indicating circuit indicates the detection of the second signal whereby the capacitor is subsequently rejected into the second lot, said vane circuit remaining in its first state when said detecting circuit does not detect the single signal whereby the capacitor is subsequently rejected into the first lot; and
- a rejecting circuit responsive to said memory circuit for effecting the rejection of the capacitor when the memor circuit is in its first state.

References Cited by the Examiner
UNITED STATES PATENTS

| | | | |
|---|---|---|---|
| 2,925,553 | 2/1960 | Shillington | 324—54 |
| 2,992,730 | 7/1961 | Rayburn et al. | 324—60 X |
| 3,048,774 | 8/1962 | Shillington | 324—54 |
| 3,082,871 | 3/1963 | Duncan | 324—54 X |

WALTER L. CARLSON, *Primary Examiner.*

G. R. STRECKER, *Assistant Examiner.*